United States Patent
Hyman et al.

(10) Patent No.: US 6,760,885 B1
(45) Date of Patent: Jul. 6, 2004

(54) SYSTEM AND METHOD FOR USING A STANDARD COMPOSITION ENVIRONMENT AS THE COMPOSITION SPACE FOR VIDEO IMAGE EDITING

(75) Inventors: Michael I Hyman, Seattle, WA (US); Frank G. Sanborn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 09/594,303

(22) Filed: Jun. 15, 2000

(51) Int. Cl.[7] .............................................. G06F 17/00
(52) U.S. Cl. ................................... 715/500.1; 345/723
(58) Field of Search ............................ 715/500.1, 513, 715/515, 516, 530; 709/206, 217, 219; 345/723, 728, 421; 370/458; 386/54

(56) References Cited

U.S. PATENT DOCUMENTS

| | | | | |
|---|---|---|---|---|
| 6,076,104 A | * | 6/2000 | McCue | 709/219 |
| 6,169,545 B1 | * | 1/2001 | Gallery et al. | 345/748 |
| 6,223,213 B1 | * | 4/2001 | Cleron et al. | 709/206 |
| 6,253,238 B1 | * | 6/2001 | Lauder et al. | 709/217 |
| 6,384,821 B1 | * | 5/2002 | Borrel et al. | 345/421 |
| 6,460,075 B2 | * | 10/2002 | Krueger et al. | 709/206 |
| 6,462,754 B1 | * | 10/2002 | Chakraborty et al. | 345/723 |
| 6,611,531 B1 | * | 8/2003 | Chen et al. | 370/458 |
| 6,665,835 B1 | * | 12/2003 | Gutfreund et al. | 715/500.1 |
| 6,675,386 B1 | * | 1/2004 | Hendricks et al. | 725/105 |
| 6,697,564 B1 | * | 2/2004 | Toklu et al. | 386/54 |

* cited by examiner

*Primary Examiner*—Sanjiv Shah
(74) *Attorney, Agent, or Firm*—Lee & Hayes, PLLC (57) ABSTRACT

A method of generating an image or a video stream in which the composition space in a standard display tool is used as the composition space. One example of a standard display tool is an HTML-compliant browser. In one embodiment, an image or a video editor gains control of the timer and the frame grabber of the standard display tool, a document encoded in a standard display language is received by the standard display tool, the editor controls the timing according to quality requirements, the standard display tool composes an image from the document in the compositor space of the standard display tool, the frame grabber transmits the image to a destination. Where the invention supports video streaming, the destination is a video compressor that collects a series of images as frames, and generates a video stream from the images. In another embodiment, an image or a video editor additionally gains control of the timer of the document and audio and video sources of the document, the editor controls the timing of the standard display tool, the document, the sources and the frame grabber according to the quality requirements.

20 Claims, 6 Drawing Sheets

SYSTEM AND METHOD FOR USING A STANDARD COMPOSITION ENVIRONMENT AS THE COMPOSITION SPACE FOR VIDEO IMAGE EDITING

RELATED APPLICATION

This application is related to copending U.S. application Ser. No. 09/587,765, filed Jun. 6, 2000 entitled "SYSTEM AND METHOD FOR PROVIDING VECTOR EDITING OF BITMAP IMAGES." Now pending.

FIELD OF THE INVENTION

This invention relates generally to video editing systems, and more particularly to the composing of an image to be used in a video in a video editing system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Microsoft Corporation, All Rights Reserved.

BACKGROUND OF THE INVENTION

Conventional video editing systems (VES) compose video from a number of different media types, such as video objects, text objects, and image objects. VES's have a separate rendering subsystem for each of the media types, that renders the object and then pass the object to a composition engine. The composition engine combines video objects, text objects and image objects into a combined image. After the composition engine combines all of the objects, it renders the combined image back to the composition space, a file, or a device. Because each of the components of the VES, such as the rendering subsystems, composition engine and composition space, are developed as separate pieces, the system is inherently closed, making it difficult to add, extend, or enhance the features, functions and/or the capabilities of the video editing system. More specifically, it is difficult to add a chart, texture, or some not-yet-thought-of control to a video.

Furthermore, each rendering subsystem supports an effects engine to change the look of an object at a specified or predetermined point in time. For example, an effect can be added to a piece of text to fade or scroll away when the life span of the text expires.

The composition space and the composition engine require position information and timing information for each object. Timing information specifies an amount of time that an object is displayed. The VES must also be able to save or embed this information so that the information can be edited at a future point in time.

Furthermore, there are no standards for the layout and position of objects in a video. The systems are closed, so all of the layout must be done within the tool itself. The layout cannot be machine generated or automated (or localized, version controlled, etc.)

In addition, each rendering subsystem supports an effects engine, the functionality of which is duplicated in browsers. This is problematic because the duplication of functionality requires additional disk space to store the software component, slows performance of the application, and adds complexity to the development of the software components that could reduce the quality of the software components.

Lastly, conventional VES's are installed and executed locally on computers. Installing, deploying and maintaining VES's on locally on computers is expensive because the installation, version control, and multiple system configurations are managed on numerous physically separate machines.

SUMMARY OF THE INVENTION

The above-mentioned shortcomings, disadvantages and problems are addressed by the present invention, which will be understood by reading and studying the following specification.

The present invention uses a browser as the composition space in a video editing system (VES), thereby providing a video editing system that is open and extensible. A standard format or language, such as hyper-text-markup-language (HTML), is used to define the image layout. Therefore, the present invention enables image composition using conventional HTML authoring tools system. Furthermore, in one embodiment, the present invention is implemented as an application service provider (ASP) service offered through the Internet.

In one aspect of the invention, a method for composing a video stream uses a standard composition environment as the composition space for image editing. The method includes initializing control of the timing of a display-language-renderer, such as an HTML browser, attaching a frame grabber service to the display-language-renderer, progressing the timing of the display-language-renderer, rendering an image from the display engine into a screen buffer including at least multi-media object, invoking the frame grabber service, and combining the image with at least one other image, yielding a video stream.

In another aspect of the invention, the method includes asserting control of the timing of a display-language-renderer, a display-language document, and a source of multimedia information. The method also includes removing external audio and video sources from the display-language document and attaching the external audio and video sources to a video compositor engine. Furthermore, the method includes attaching a frame grabber service to the display-language-renderer. Subsequently, the method includes progressing the timing of the display-language-renderer, the display-language document, and the multimedia information. Thereafter, an image is rendered into a screen buffer of the display-language-renderer from the document, and the multimedia information is composited with the rendered image and the multimedia information. Thereafter, the method includes invoking the frame grabber service, and combining the composited images with other images in a video stream.

In yet another aspect of the invention, an apparatus includes a display-language-renderer, that receives an HTML document. The renderer generates a composed image from the HTML document. The composed image is generated in a compositor of the renderer. The apparatus also includes a timing service attached to the renderer. The timing service is controlled by a video editing system. The apparatus also includes a video compressor that communicates with the renderer that receives the composed image from the renderer and combines the composed image with other composed images, yielding a video stream.

In still another aspect of the invention, an apparatus includes display-language-renderer that receives an HTML document. The renderer generates a composed image from the HTML document. The apparatus also includes a compositor that is external to the renderer. The compositor is coupled to the renderer. The compositor receives the composed image and multimedia data. The compositor has a timing service. The compositor timing service is attached to the multimedia resource and the HTML document.

A second timing service is attached to the compositor and the second timing service controlled by a VES.

When the second timing service is incremented by the VES, the compositor timing service that is attached to the multimedia resource and the HTML document, is thereby incremented, and the compositor generates a second image from the composed image and the resource.

The present invention is suitable for use by application service provider (ASP) systems and/or a web-based implementation of a video editing system where the rendering portion of the present invention is distributed among rendering components that are distributed across communication lines.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular HTML browser implementation of the invention is described. Finally, in the fifth section, a conclusion of the detailed description is provided.

Hardware and Operating Environment

Figure 1:
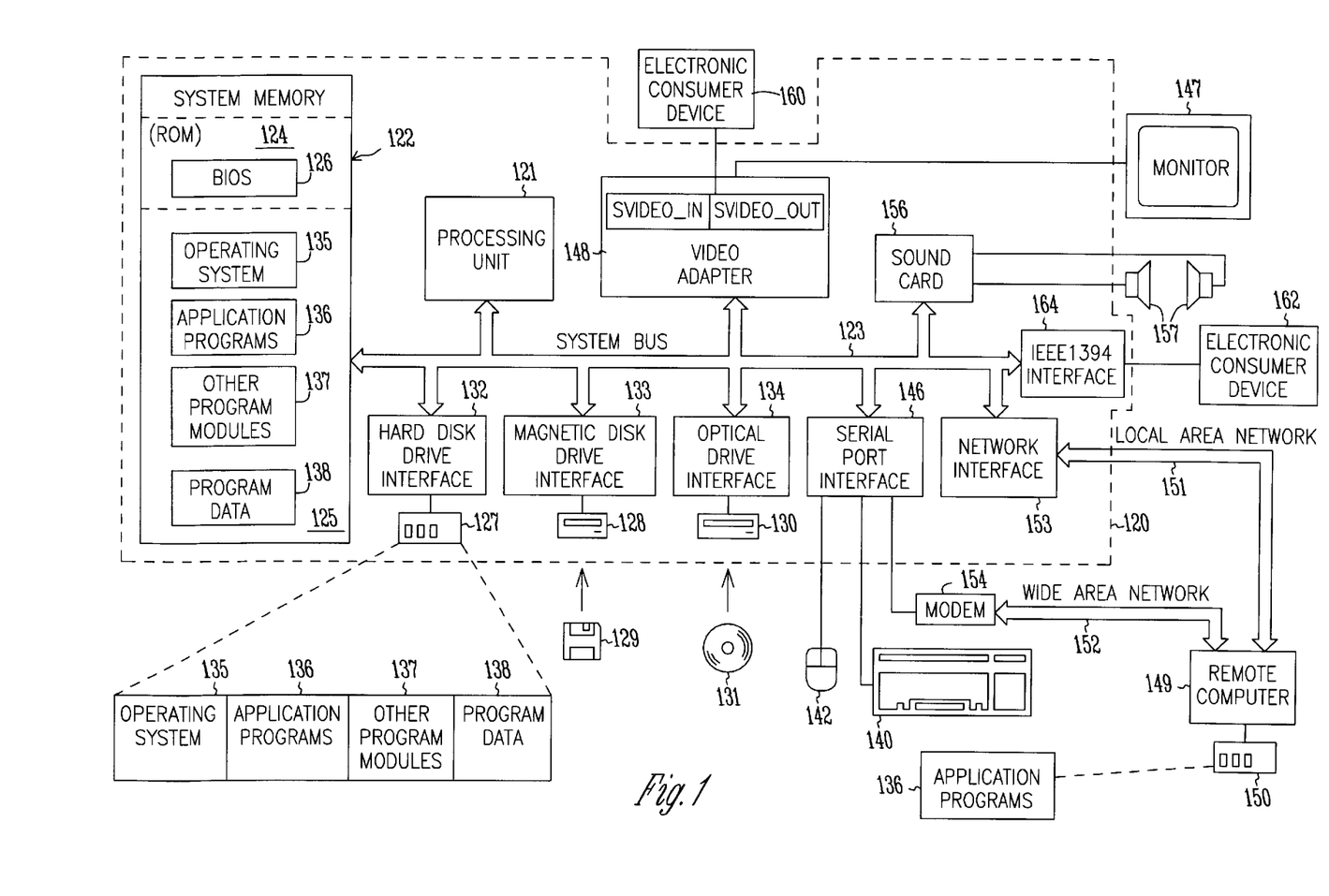
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implements particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 120, including a processing unit 121, a system memory 122, and a system bus 123 that operatively couples various system components include the system memory to the processing unit 121. There may be only one or there may be more than one processing unit 121, such that the processor of computer 120 comprises a single central-processing unit (CPU), or a plurality of processing units, commonly referred to as a parallel processing environment. The computer 120 may be a conventional computer, a distributed computer, or any other type of computer; the invention is not so limited.

The system bus 123 may be any of several types of bus structures including a memory bus or memory controller, a peripheral bus, and a local bus using any of a variety of bus architectures. The system memory may also be referred to as simply the memory, and includes read only memory (ROM)

124 and random access memory (RAM) 125. A basic input/output system (BIOS) 126, containing the basic routines that help to transfer information between elements within the computer 120, such as during start-up, is stored in ROM 124. The computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media.

The hard disk drive 127, magnetic disk drive 128, and optical disk drive 130 are connected to the system bus 123 by a hard disk drive interface 132, a magnetic disk drive interface 133, and an optical disk drive interface 134, respectively. The drives and their associated computer-readable media provide nonvolatile storage of computer-readable instructions, data structures, program modules and other data for the computer 120. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 129, optical disk 131, ROM 124, or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port, or a universal serial bus (USB). A monitor 147 or other type of display device is also connected to the system bus 123 via an interface, such as a video adapter 148. A consumer device 160 such as a video cassette recorder, a camcorder, and/or a digital video-camcorder, etc., that will read and write digital video data also connected to the system bus 123 via an interface, such as a video adapter 148. A consumer device 162 such as a video cassette recorder, a camcorder, and/or a digital video-camcorder, etc., that will read and write digital video data may also be connected to the system bus 123 via an interface, such as an adapter 148 that complies with the IEEE 1394 "Firewire" standard. The IEEE 1394 "Firewire" standard is defined by the Institute of Electrical and Electronics Engineers, Inc. (IEEE) Standard 1394-1995 for a High Performance Serial Bus (approved Dec. 12, 1995 by the IEEE Standards Board and Jul. 22, 1996 by the American National Standards Institute).

In addition to the monitor, computers typically include other peripheral output devices (not shown), such as speakers and printers.

The computer 120 may operate in a networked environment using logical connections to one or more remote computers, such as remote computer 149. These logical connections are achieved by a communication device coupled to or a part of the computer 120; the invention is not limited to a particular type of communications device. The remote computer 49 may be another computer, a server, a router, a network PC, a client, a peer device or other common network node, and typically includes many or all of the elements described above relative to the computer 120, although only a memory storage device 150 has been illustrated in FIG. 1. The logical connections depicted in FIG. 1 include a local-area network (LAN) 151 and a wide-area network (WAN) 152. Such networking environments are commonplace in offices, enterprise-wide computer networks, intranets and the Internet.

When used in a LAN-networking environment, the computer 120 is connected to the local network 151 through a network interface or adapter 153, which is one type of communications device. When used in a WAN-networking environment, the computer 120 typically includes a modem 154, a type of communications device, or any other type of communications device for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

SYSTEM LEVEL OVERVIEW

Figure 2:
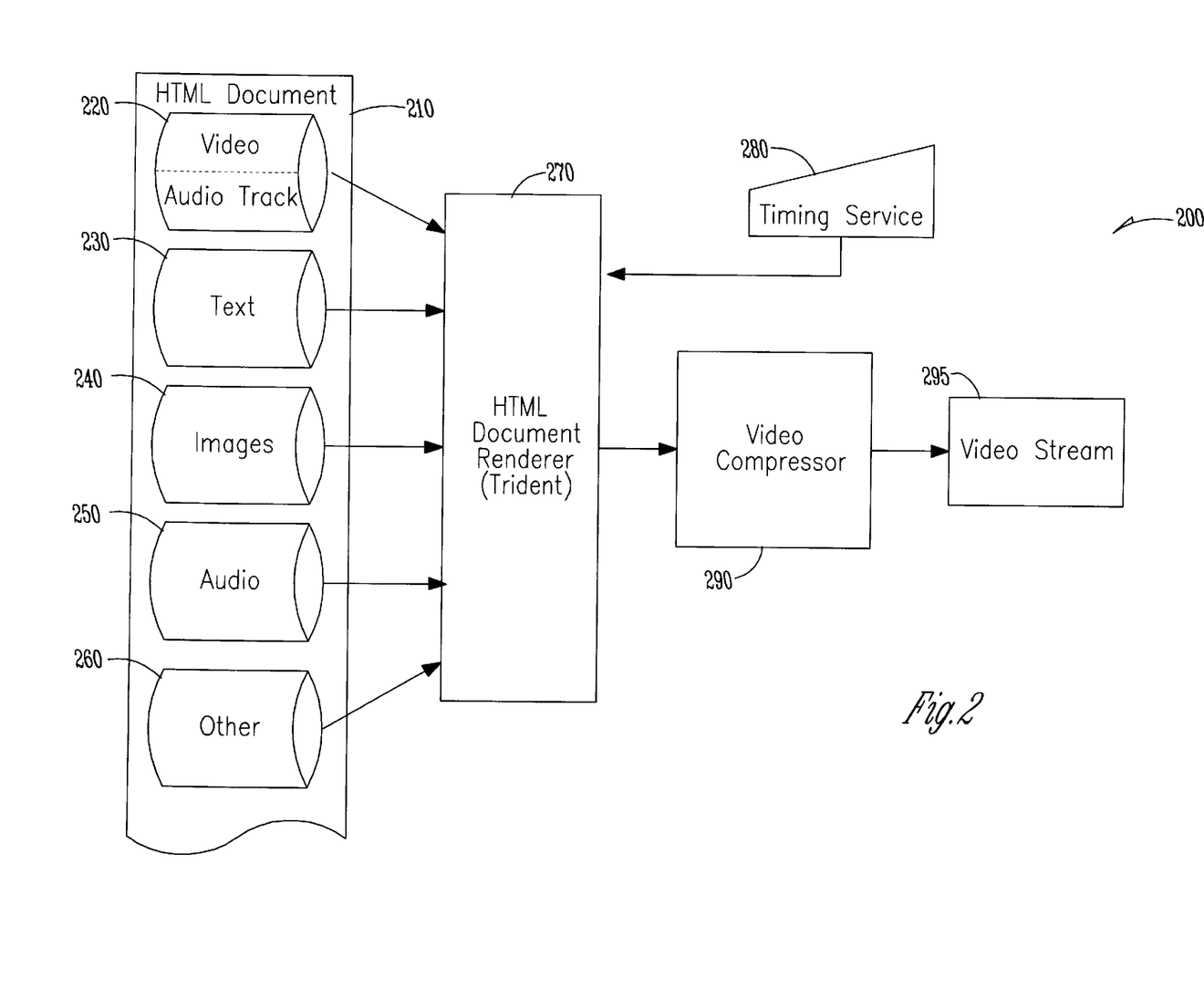
FIG. 2 is a diagram illustrating a system-level overview of an exemplary embodiment of the invention.

A system level overview of the operation of an exemplary embodiment of the invention is described by reference to FIG. 2.

System 200 includes a document that complies with a standard display-language, such as a hyper-text-markup-language (HTML) document 210. The HTML document intrinsically includes, or hyperlinks to, a video stream with an associated audio track 220, text 230, an image 240, an audio stream 250, and other forms of multimedia data 260. System 200 also includes a display-language-renderer 270, such as an HTML compliant browser that receives the HTML document 210, and render, composes or generates a composed image or page (not shown), from the HTML document 210, in a compositor (not shown) of the display-language-renderer. A timing service 280 is operably coupled to the display-language-renderer 270. In one embodiment, the coupling of the timing service is implemented by attaching the timing service to the display-language-renderer 270. The timing service 280 is configured and/or controlled by a video editing system (not shown). A video compressor 290 is operably coupled to the display-language-renderer 270 that receives the composed image or page from the display-language-renderer and combines the composed image or page with a plurality of composed images or pages, yielding a video stream 295.

The system 200 also optionally includes a frame grabber (not shown) that is operably attached to the browser 270, that transmits the composed image or page to the video compressor 290.

The present invention uses a standard document language, such as HTML and a renderer that complies with the standard language, such as a browser, so that the problem of modifying a proprietary video or image editing system to new effects and forms of data and then distributing the modified compositing system to users is eliminated by using the compositing engine of a renderer that is compliant with the standard language. The present invention also solves the problem of a lack standards for the layout and position of objects in video editing, by adopting a standardized display language, such as HTML.

The system level overview of the operation of an exemplary embodiment of the invention has been described in this section of the detailed description. Video layouts are written in a standard display language, such as HTML, and the composting engine of a rendering tool, such as an HTML-compliant browser, is used to composite an image or page. While the invention is not limited to any particular standard display language or renderer, for sake of clarity a simplified HTML-compliant system has been described.

METHODS OF AN EXEMPLARY EMBODIMENT OF THE INVENTION

In the previous section, a system level overview of the operation of an exemplary embodiment of the invention was described. In this section, the particular methods performed by the server and the clients of such an exemplary embodiment are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Figure 3:
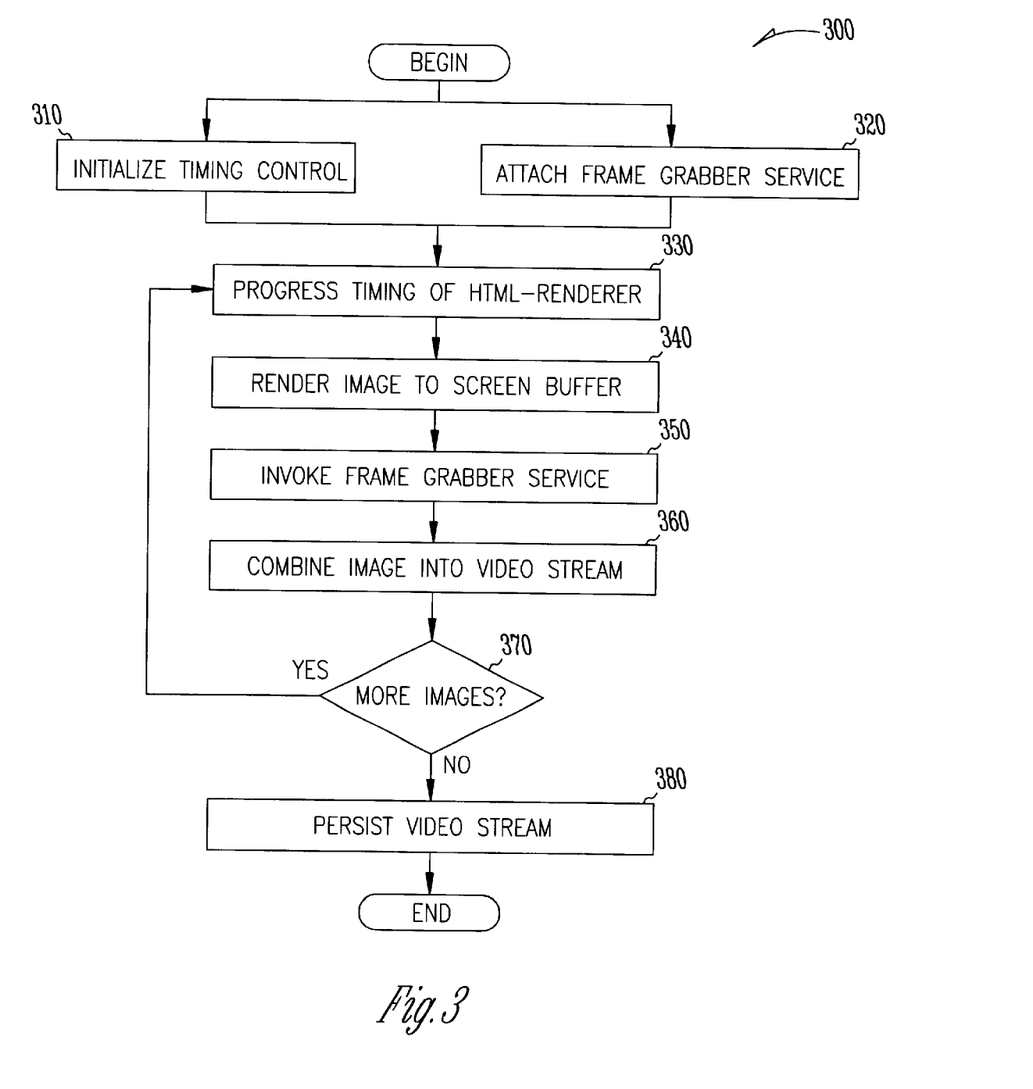
FIG. 3 is a flowchart of a method for composing a video stream using a standard composition environment within a standard-display-language-renderer as the composition space for image or page editing, to be performed by a computer according to an exemplary embodiment of the invention.

Referring first to FIG. 3, a flowchart of a method 300 for composing a video stream using a standard composition environment, such as the composition space in a browser, as the composition space for image or page editing, to be performed by a computer according to an exemplary embodiment of the invention, is shown. This method is inclusive of the acts required to be taken by a video editing system (VES). Method 300 uses the browser to render all decorative elements (e.g. text, images) as well as video and audio elements.

Method 300 includes initializing control of the timing of a display-language-renderer 310 by the VES, which puts all time changes under the control of the VES. In one embodiment, the display-language-renderer is a browser, such as Microsoft Internet Explorer. Any one of the other available browsers may be used also. In another embodiment, the display-language is a standard display language. A standard display language is a display language established by authority, custom, or general consent within the community of software developers, such as hyper text markup language (HTML). In yet another embodiment, initializing timing control 310 includes attaching a timer service associated with, or controlled by the VES, to the display-language-renderer. In still another embodiment, attaching a timer service to the display-language-renderer includes attaching a timer service to a video compositor engine of the display-language-renderer.

Bringing the timing of the display-language-renderer under control of the VES enables the VES to override the fixed number of times per second that the timer progresses, and therefore, the number of images, pages or frames rendered as required for video streams. This enables the display-language-renderer to be used for composing video streams. A service (e.g. a timer service) is a component, program or routine that provides support, such as additional functionality, to other components.

Method 300 also includes attaching a frame grabber service to the display-language-renderer 320. Attaching a frame grabber enables the VES to manage rendered images. In varying embodiments, initializing the timing control 310 is performed before, during, or after attaching a frame grabber.

Subsequently, method 300 includes progressing the timing of the display-language-renderer 330. In one embodiment, progressing the timing of the display-language-renderer 330 includes incrementing the timer service.

Thereafter, method 300 includes rendering an image into a screen buffer from a document that defines positioning information and timing information for each object in a standard language, and from at least one object and/or at least one display-language-renderer element 340. In one embodiment, rendering 340 is performed by the display-language-renderer. In another embodiment, the document complies with HTML.

Subsequently, method 300 includes invoking the frame grabber service 350. In one embodiment, invoking the frame grabber 350 is performed by the display-language-renderer such as a browser. In another embodiment, automatic invocation of the frame grabber is triggered as an attached behavior in the document, as a Component Object Model (COM) object, such as an ActiveX component, or as a java applet, etc. In another embodiment, where the display language-renderer does not support automatic invocation of the framer grabber service, invoking the frame grabber 350 includes calling the frame grabber service from the timer service. In yet another embodiment, calling the frame grabber is performed after the timer service is incremented.

Thereafter, method 300 includes combining the image or page with at least one other image or page, yielding a video stream 360. In one embodiment, the progressing 330, the rendering 340, the invoking 350 and the combining 360 is performed in repetition for each image or page in the video stream.

Subsequently, a determination is made as to whether or not more images are to be rendered 370. If more images are to be rendered, the method continues with the action of progressing the timing 330. If more images are not to be rendered, then method 300 persists the video stream to final form 380.

Figure 4:
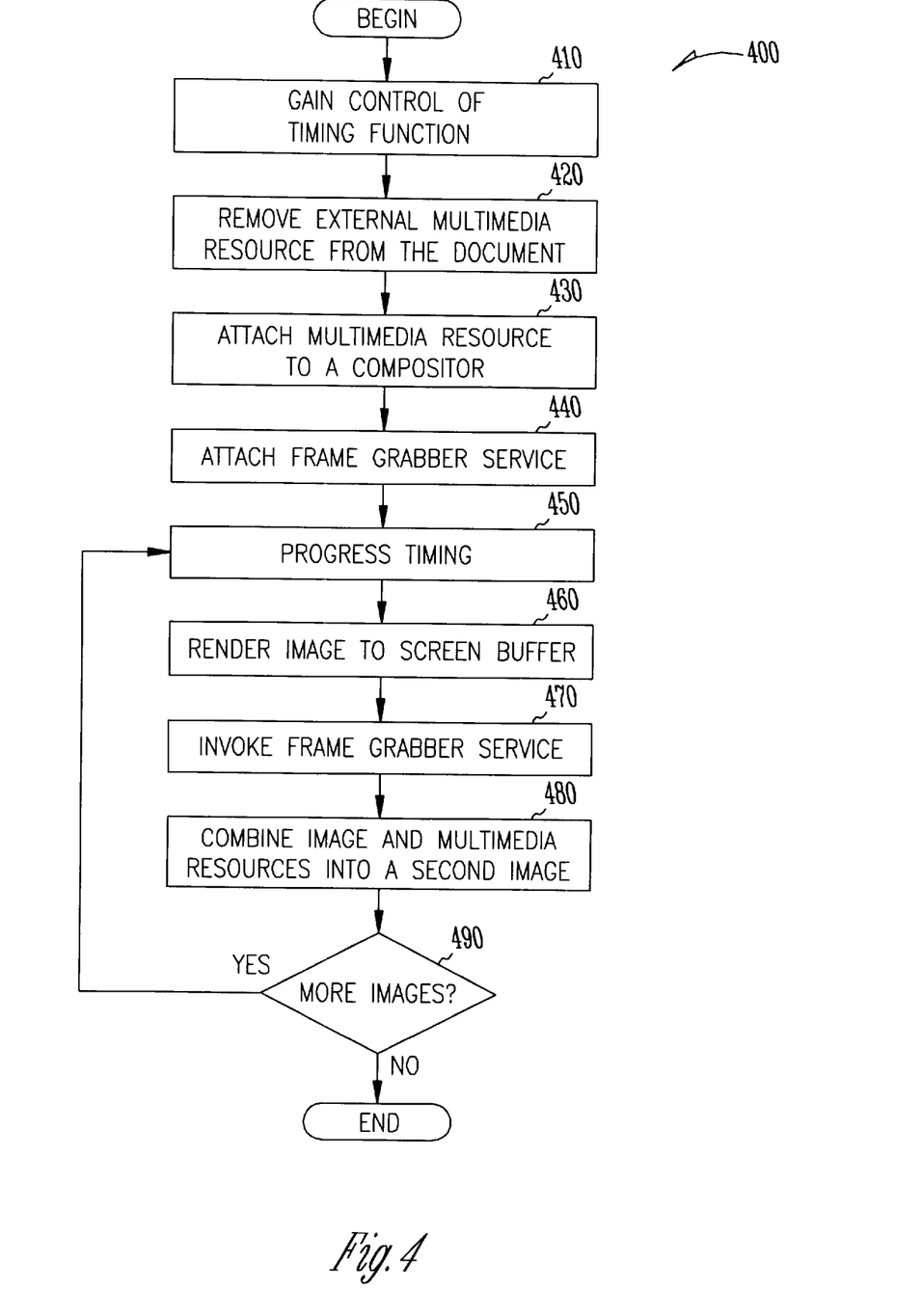
FIG. 4 is a flowchart of a method for composing a video stream using a standard composition environment external to a standard-display-language-renderer as the composition space for image or page editing, to be performed by a computer according to an exemplary embodiment of the invention.

Referring next to FIG. 4, a flowchart of a method 400 for composing a video stream using a standard composition environment, such as the composition space in a browser, as the composition space for image or page editing, to be performed by a computer according to an exemplary embodiment of the invention, is shown. This method is inclusive of the acts required to be taken by a VES. Method 400 uses the browser to render all decorative elements (e.g. text, images) and a separate renderer for the video and audio.

Method 400 includes initializing or gaining control of timing function 410, which includes gaining or asserting control of the timing of a display-language-renderer by the VES, which puts all time changes under the control of the VES. In one embodiment, the display-language-renderer is a browser, such as Microsoft Internet Explorer. Any one of the other available browsers may be used also. In another embodiment, the display-language is a standard display language. A standard display language is a display language established by authority, custom, or general consent within the community of software developers, such as hyper text markup language (HTML). In yet another embodiment, initializing timing control of the render includes attaching a timer service associated with, or controlled by the VES, to the display-language-renderer. In still another embodiment, attaching a timer service to the display-language-renderer includes attaching a timer service to a video compositor engine of the display-language-renderer.

Bringing the timing of the display-language-renderer under control of the VES in action, enables the VES to override the fixed number of times per second that the timer of the renderer progresses, and therefore, enables the VES to control the number of images or frames rendered as required for video streams. This enables the display-language-renderer to be used for composing video streams. A service (e.g. a timer service) is a component, program or routine that provides support, such as additional functionality, to other components.

Initializing or gaining control of timing function 410 also includes gaining or asserting control of the timing of the display-language document and gaining or asserting control of the timing of at least one source of multimedia information. In one embodiment, the display language document is an HTML document. In another embodiment, gaining or asserting control of the timing of the display-language document includes attaching the timer service to the document, in which the time service is the same timer service as the time service attached in action to the renderer.

Initializing or gaining control of timing function 410 also includes gaining or asserting control of the timing of at least one source of multimedia information. In one embodiment, gaining or asserting control of the timing of at least one source of multimedia information includes attaching the timer service to the multimedia information source, in which the time service is the same timer service as the time service attached to the renderer.

Method 400 also includes removing and/or disabling external audio and video sources from a display-language document 420. In one embodiment, removing and/or disabling external audio and video sources from a display-language document 420 is accomplished by "muting" or turning down a volume. In another embodiment, removing and/or disabling external audio and video sources from a display-language document 420 is accomplished by modifying a audio/video filter graph. In yet another embodiment, the display language document is an HTML document.

Method 400 also includes attaching the external audio and video sources (that were removed in action 420) to the video compositor engine of the display-language-renderer 430.

Method 400 also includes attaching a frame grabber service to the display-language-renderer 440. Attaching a frame grabber enables the VES to manage rendered images.

In varying embodiments, initializing the timing control 410 is performed before, during, or after attaching a frame grabber.

Subsequently, method 400 includes progressing the timing 450. In one embodiment, progressing the timing of the display-language-renderer 450 includes incrementing the timer service. In another embodiment, progressing the timing also includes progressing the timing of the display-language-renderer, the display-language document and multimedia resources. In one embodiment, progressing the timing of the display-language document includes incrementing the timer service attached to the display-language document. In another embodiment, progressing the timing of the multimedia resources includes incrementing the timer service attached to the multimedia source.

Thereafter, method 400 includes rendering an image or page into a screen buffer from at least one multimedia object 460, such as text, image and other data. In one embodiment, rendering 460 is performed by the display-language-renderer.

In one embodiment of method 400, progressing or incrementing the timer service, will prompt incrementing the video compositor, which will prompt incrementing of the HTML document and increment the multimedia source, which will render the resulting page 460.

In one embodiment, invoking the frame grabber 470 is performed by the display-language-renderer such as a browser. In another embodiment, automatic invocation of the frame grabber is triggered as an attached behavior in the document, or as a COM object, such as an ActiveX component, or as a java applet, etc. In another embodiment, where the display language-renderer does not support automatic invocation of the framer grabber service, invoking the frame grabber 470 includes calling the frame grabber service from the timer service. In yet another embodiment, calling the frame grabber is performed after the timer service is incremented.

Thereafter, the retrieved image and the multimedia resources are received by a compositor server which combines the retrieved image and multimedia resources into a second image or frame 480.

Subsequently, a determination is made as to whether or not more images are to be rendered 490. If more images are to be rendered, the method continues with the action of progressing the timing 450.

Figure 5:
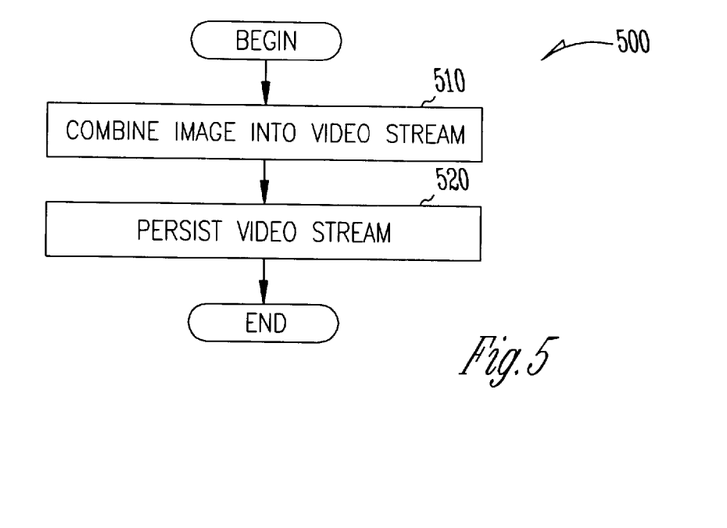
FIG. 5 is a flowchart of a method of additional action to FIG. 4 for composing a video stream, to be performed by a computer according to an exemplary embodiment of the invention.

Referring next to FIG. 5, a flowchart of a method 500 of additional action to method 400 in FIG. 4 for composing a video stream from the image or page produced in method 400, using a standard composition environment, such as the composition space in a browser, as the composition space for image or page editing, to be performed by a computer according to an exemplary embodiment of the invention, is shown. This method is inclusive of the acts required to be taken by a VES. Method 500 uses the browser to render all decorative elements (e.g. text, images) and a separate renderer for the video and audio.

Method 500 includes combining the image or page with at least one other image or page, yielding a video stream 510. In one embodiment, the image or page is a frame in a video stream in which the video stream has a plurality of frames, the other image or page was generated by an execution or performance of method 400, and the progressing 460, 465, and 470, the rendering 480, the invoking 490 in FIG. 4 and the combining 510 are performed in repetition for each image or page in the video stream.

Method 500 also includes persisting the video stream, that is generated in action 510, to final form 520.

Figure 6:
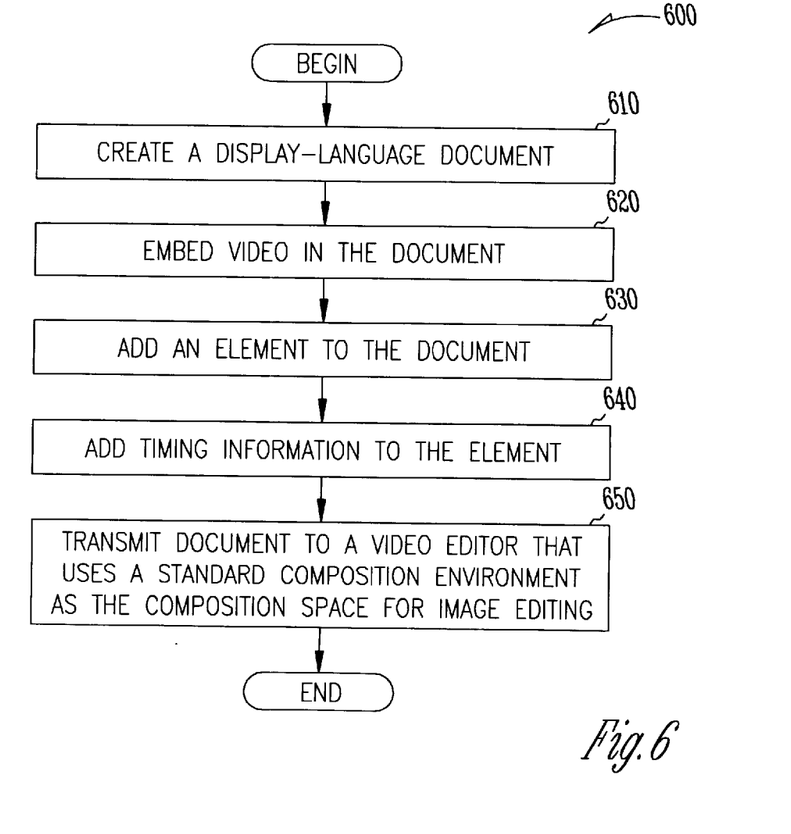
FIG. 6 is a flowchart of a method for composing or preparing a document for use by a method of composing an image or page using a standard composition space, to be performed by a computer according to an exemplary embodiment of the invention.

Referring next to FIG. 6, a flowchart of a method 600 for composing or preparing a document for use by a method of composing an image or page using a standard composition space, such as method 300 and method 400, to be performed by a computer according to an exemplary embodiment of the invention, is shown.

The method includes creating a display-language document 610. In one embodiment, the display language is HTML and the display-language document is an HTML document.

The method subsequently includes embedding a video stream into the display-language document 620. In one embodiment, where the display-language document is an HTML document, embedding a video stream into the display-language document 620 includes embedding a video stream into the display-language document using the display-language+Time video element. In another embodiment, the HTML+time video element is compliant to the Synchronized Multimedia Integration Language (SMIL) Boston specification that defines a simple XML-based language that allows authors to write interactive multimedia presentations that describe the temporal behavior of a multimedia presentation, associate hyperlinks with media objects and describe the layout of the presentation on a screen. In yet another embodiment, embedding a video stream into the display-language document 620 includes specifying the media player service to play the video stream. In still another embodiment, embedding a video stream into the display-language document 620 includes inserting a component that enables interaction with other components. In still yet another embodiment, the component that enables interaction with other components includes a COM object, such as an ActiveX component.

Method 600 also includes adding a display-language element to the display-language document 630. In one embodiment, adding display-language elements to the display-language document 630 includes specifying the position and layout. In another embodiment, specifying the position and layout includes using a cascading style sheet (CSS). In yet another embodiment, specifying the position and layout includes using standard HTML elements, such as tables, in which to perform the layout, each element is placed into a table.

Thereafter, method 600 includes adding timing information to the display-language element 640. In one embodiment, where the display language is HTML, adding timing information to the display-language element 640 includes invoking a HTML+Time service. In another embodiment, adding timing information to the display-language element 640 includes invoking a script. Thereafter, method 600 includes transmitting the display-language document to a VES that uses a standard composition environment as the composition space for image or page editing 650. In one embodiment, the VES implements method 300. In another embodiment, the VES implements method 400.

BROWSER IMPLEMENTATION

In this section of the detailed description, a particular implementation of the invention is described that implements a display-language-render to render decorative elements, and implements a compositor external to the display-language-render to composite the rendered decorative elements with multimedia resources.

Figure 7:
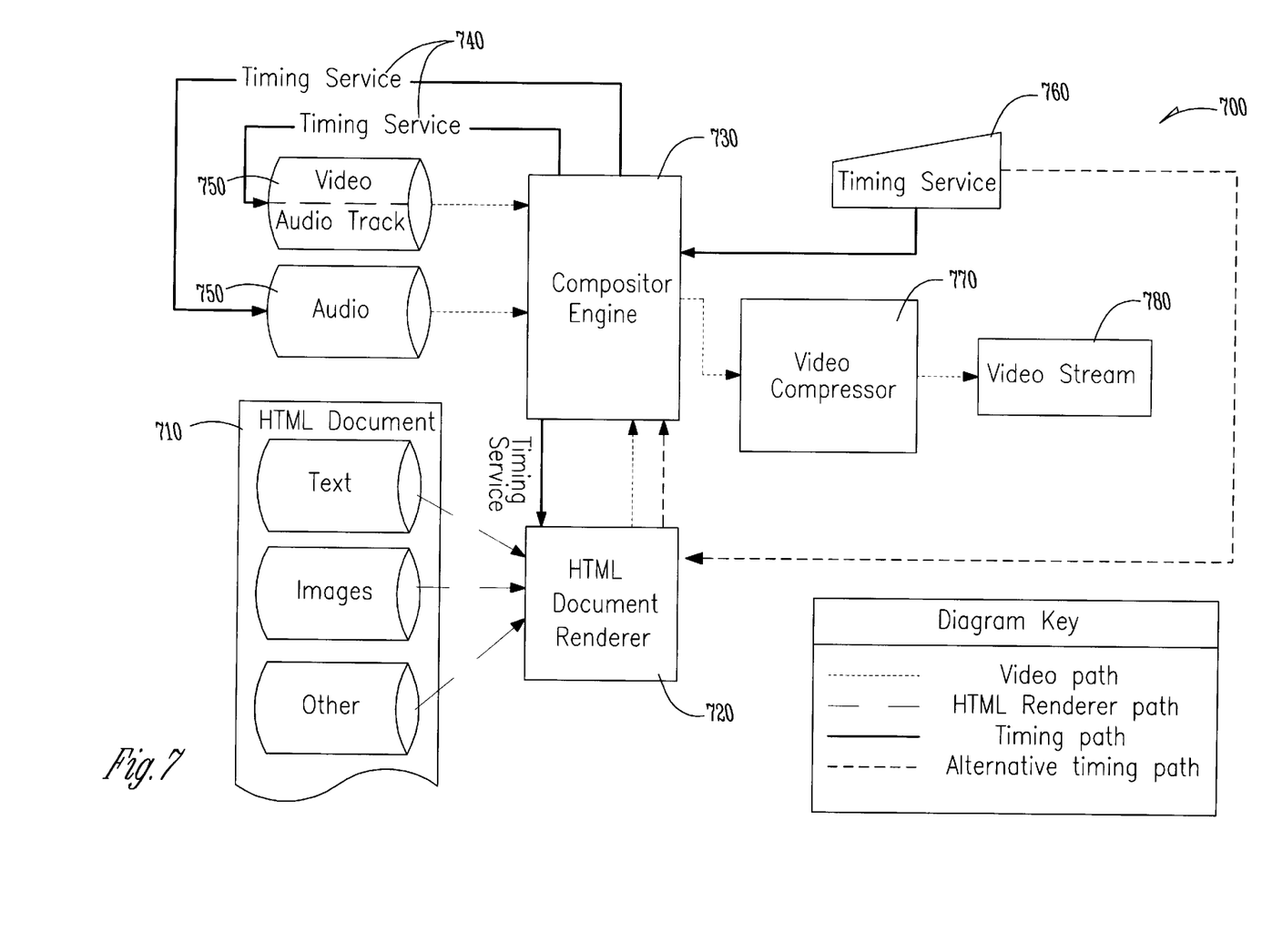
FIG. 7 is a block diagram of an apparatus of an exemplary embodiment of the invention.

An apparatus 700 of the operation of an exemplary embodiment of the invention is described by reference to FIG. 7.

Apparatus 700 also includes a document that complies with a standard display-language, such as an HTML document 710. Apparatus 700 also includes a display-language-renderer 720, that receives the HTML document 710, and generates a composed image (not shown), from the HTML document 710. In one embodiment, the display-language-renderer is an HTML-compliant browser, such as Microsoft Internet Explorer.

Apparatus 700 also includes a compositor 730 that is operably coupled through an application program interface (API) to the display-language-renderer 720, and that receives at least one multimedia resource 750. In one embodiment the API is a frame-grabber. In another embodiment, the API is a DxTransform. In yet another embodiment, the compositor 730 that is operably coupled to the display-language-renderer 720 through a DxTransform, A frame grabber (not shown) transmits the captured image to the compositor. The multimedia resource 750 in varying embodiments includes a video stream with an audio track and/or an audio stream. The compositor 730 includes a timing service 740 that is operably coupled to the multimedia resource 750. The compositor 730 receives the composed image (not shown) and multimedia information 750 from the resource. The compositor 730 generates a second image (not shown) from the composed image and the resource.

Apparatus 700 also includes a second timing service 760 that is operably coupled to the compositor 730. In one embodiment, the coupling is implemented by attaching the second timing service 760 to the compositor 730. The second timing service 760 is controlled by a video editing system.

Apparatus 700 also includes a video compressor 770 that is operably coupled to the compositor 730. The compressor 770 receives the second image (not shown) from the compositor 730 and combines the second image with a plurality of images, yielding a video stream 780.

The present invention is suitable for use by application service provider (ASP) systems and/or a web-based implementation of a video editing system where the rendering portion of the present invention is distributed among rendering components that are distributed across communication lines. More specifically, a number of display-language-renderers executing on a number of computer in communication through a network are used instead of the single the display-language-renderer so that the workload of rendering is distributed and balanced among a number of computers. In one embodiment, the network further is the Internet.

CONCLUSION

A video editing system that uses the compositor of a standard display tool has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

In particular, one of skill in the art will readily appreciate that the names of the methods and apparatus are not intended to limit embodiments of the invention. Furthermore, additional methods and apparatus can be added to the components, functions can be rearranged among the components, and new components to correspond to future enhancements and physical devices used in embodiments of the invention can be introduced without departing from the scope of embodiments of the invention.

For example, those of ordinary skill within the art will appreciate that embodiments of the invention are applicable to future display tools and renderers, display languages, video editing systems, different file systems, and new data types.

More specifically, in computer-readable program embodiments of system 200 and apparatus 700, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). The components execute on as few as one computer as in computer 120 in FIG. 1, or on at least as many computers as there are components.

The present invention generates an image or a video stream in which the composition space in a standard display tool is used instead of the composition space of an image or video editor. One example of a standard display tool is an HTML-compliant browser. In one embodiment, an image or a video editor gains control of the timer and the frame grabber of the standard display tool, a document encoded in a standard display language is received by the standard display tool, the editor controls the timing according to quality requirements, the standard display tool composes an image or page from the document in the compositor space of standard display tool, the frame grabber transmits the image or page to a destination. Where the invention supports video streaming, the destination is a video compressor that collects a series of image or pages as frames, and generates a video stream from the images. In another embodiment, an image or a video editor additionally gains control of the timer of the document and audio and video sources of the document, the editor controls the timing of the standard display tool, the document, the sources and the frame grabber according to the quality requirements.

The present invention is suitable for use by application service provider (ASP) systems and/or a web-based implementation of a video editing system where the rendering portion of the present invention is distributed among more than one rendering components that are distributed across communication lines.

The terminology used in this application with respect to is meant to include all of these video editing environments. Therefore, it is manifestly intended that this invention be limited only by the following claims and equivalents thereof.

We claim:

1. A computer-readable medium having computer-executable instructions for:

asserting control of the timing of a display-language-renderer;

asserting control of the timing of a display-language document;

asserting control of the timing of at least one source of multimedia information;

removing external audio and video sources from the display-language document;

attaching the external audio and video sources to a video compositor engine;

attaching a frame grabber service to the display-language-renderer;

progressing the timing of the display-language-renderer;

progressing the timing of the display-language document;

progressing the timing of the at least one source of multimedia information;

rendering an image into a screen buffer of the display-language-renderer;

invoking the frame grabber service; and combining the image and the external audio and video sources into a video stream.

2. The computer readable medium of claim 1, wherein the display-language-renderer comprises a browser.

3. The computer readable medium of claim 1, further comprising instructions for:

combining the image and the external audio and video sources into a second image.

4. The computer readable medium of claim 3, wherein the image is a frame in a video stream, the video stream having a plurality of frames;

wherein for each image in the video stream, the instructions comprise:

combining the image with at least one other image, yielding a video stream; and persisting the video stream to final form; and wherein the progressing, the rendering, the invoking and the combining is performed in repetition for each image in the video stream.

5. The computer readable medium of claim 1, wherein asserting control of the timing of the display-language-renderer comprises instructions for:

attaching a timer service to the display-language-renderer;

asserting control of the timing of the display-language document comprises instructions for:

attaching the timer service to the display-language document;

asserting control of the timing of the at least one source of multimedia information comprises instructions for:

attaching the timer service of the at least one source of multimedia information;

progressing the timing of the display-language-renderer comprises instructions for:

incrementing the timer service of the display-language-renderer;

progressing the timing of the display-language document comprises instructions for:

incrementing the timer service of the display-language; and progressing the timing of the at least one source of multimedia information comprises instructions for:

incrementing the timer service of the at least one source of multimedia information.

6. The computer readable medium of claim 5, wherein attaching a timer service to the display-language-renderer comprises instructions for attaching a timer service to the video compositor engine of the display-language-renderer.

7. The computer readable medium of claim 5, wherein attaching the timing service of the display-language-renderer to the display-language document and at least one source of multimedia information comprises instructions for:

attaching the timing service of the video compositor engine of the display-language-renderer to the display-language document and at least one source of multimedia information.

8. The computer readable medium of claim 1, wherein the at least one source of multimedia information comprises a video source and an audio source.

9. The computer readable medium of claim 1, wherein invoking the frame grabber is performed by the display-language-renderer.

10. The computer readable medium of claim 1, wherein invoking the frame grabber comprises instructions for calling the frame grabber service from the timer service.

11. A computerized method for composing an image comprising:
asserting control of the timing of a display-language-renderer;
asserting control of the timing of a display-language document;
asserting control of the timing of at least one source of multimedia information;
removing external audio and video sources from the display-language document;
attaching the external audio and video sources to a video compositor engine;
attaching a frame grabber service to the display-language-renderer;
progressing the timing of the display-language-renderer;
progressing the timing of the display-language document;
progressing the timing of the at least one source of multimedia information;
rendering an image into a screen buffer of the display-language-renderer; and
invoking the frame grabber service.

12. The computerized method as in claim 11, wherein the display-language-renderer further comprises a browser.

13. The computerized method as in claim 11, further comprising:
combining the image and the external audio and video sources into a second image.

14. The computerized method as in claim 13,
wherein the image is a frame in a video stream, the video stream having a plurality of frames;
wherein for each image in the video stream, the method further comprises:
combining the image with at least one other image, yielding a video stream; and
persisting the video stream to final form; and
wherein the progressing, the rendering, the invoking and the combining is performed in repetition for each image in the video stream.

15. The computerized method as in claim 11, wherein asserting control of the timing of the display-language-renderer further comprises:
attaching a timer service to the display-language-renderer;
asserting control of the timing of the display-language document further comprises:
attaching the timer service to the display-language document;
asserting control of the timing of the at least one source of multimedia information further comprises:
attaching the timer service of the at least one source of multimedia information;
progressing the timing of the display-language-renderer further comprises:
incrementing the timer service of the display-language-renderer;
progressing the timing of the display-language document further comprises:
incrementing the timer service of the display-language; and
progressing the timing of the at least one source of multimedia information further comprises:
incrementing the timer service of the at least one source of multimedia information.

16. The computerized method as in claim 15, wherein attaching a timer service to the display-language-renderer further comprises attaching a timer service to the video compositor engine of the display-language-renderer.

17. The computerized method as in claim 15, wherein attaching the timing service of the display-language-renderer to the display-language document and at least one source of multimedia information further comprises:
attaching the timing service of the video compositor engine of the display-language-renderer to the display-language document and at least one source of multimedia information.

18. The computerized method as in claim 11, wherein the at least one source of multimedia information further comprises a video source and an audio source.

19. The computerized method as in claim 11, wherein invoking the frame grabber is performed by the display-language-renderer.

20. The computerized method as in claim 11, wherein invoking the frame grabber further comprises calling the frame grabber service from the timer service.

* * * * *